Aug. 4, 1959
M. GRAF
2,897,844
HARNESS FRAME FOR LOOMS
Filed Aug. 16, 1956
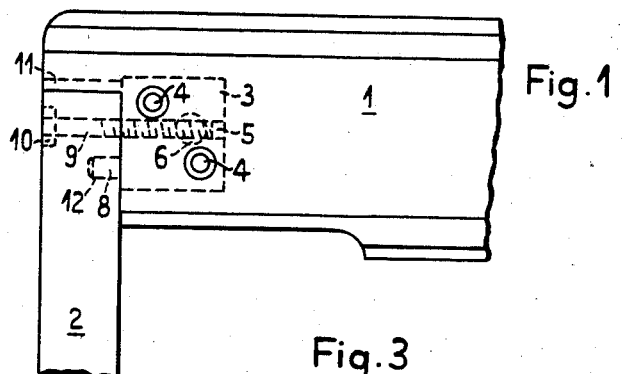
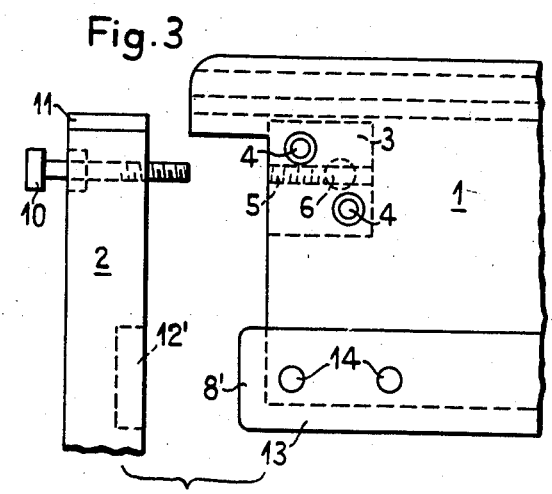
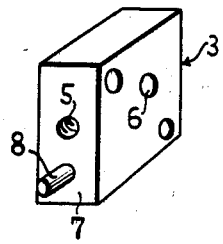
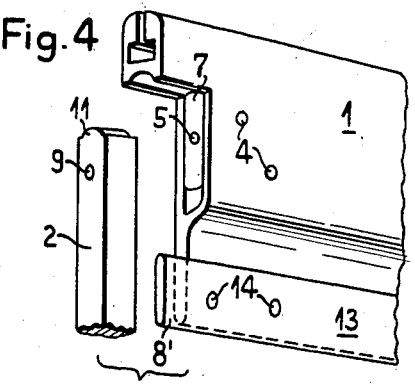
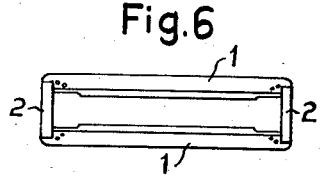

2,897,844

Patented Aug. 4, 1959

2,897,844

HARNESS FRAME FOR LOOMS

Martin Graf, Horgen, Switzerland, assignor to Grob & Co. Aktiengesellschaft, Horgen, near Zurich, Switzerland Application August 16, 1956, Serial No. 604,467

Claims priority, application Switzerland August 17, 1955

7 Claims. (Cl. 139—91)

The present invention relates to harness frames for looms, and has the main objects of providing a harness frame which can be easily dismantled and assembled, repaired, adjusted to varying requirements and dimensions, and which when stored or transported, requires little space.

With these and other objects in view I provide a harness frame comprising in combination: carrier bars, side support members detachably joined to the said carrier bars, single screw bolts passing across each end of the said side support members longitudinally into the adjacent end of one of the said carrier bars, inserts engaging the screw thread of the said screw bolts and preventing the same from turning inadvertently, and interlocking means restraining the said side support members from turning relative to the said carrier bars about the said bolts.

These and other objects and features of my invention will be clearly understood from the following description of some embodiments thereof given by way of example with reference to the accompanying drawing in which:

Fig. 1 is an elevation of the left hand upper corner of a harness frame embodiment, Fig. 2 is a perspective view of a bearing block used in this embodiment, Fig. 3 is an elevation of the left hand upper corner of a second embodiment, with the support member in disassembled position, Fig. 4 is a corresponding perspective view, Fig. 5 is a perspective view of a detail and Fig. 6 is an elevation of a harness frame on a reduced scale.

In Fig. 1, the upper carrier bar is denoted 1, and the detachable lateral support member is denoted 2. The carrier bar 1 is designed as a hollow profile. In the cavity formed within the walls of the profile a bearing block 3 is inserted (Fig. 2) and fixed by means of rivets 4. This bearing block 3 has a longitudinal bore 5 and a transverse bore 6. The bore 5 is tapped with a screw thread right up to the bore 6. Moreover the said bearing block comprises a projecting portion on its end face 7 facing towards the side support. In the embodiment illustrated this portion is a pin 8. However it may alternatively be a plate, rib or the like.

The side support member 2 has a bore 9 for receiving a screw bolt 10 extending approximately axially with respect to the carrier bar 1, this bolt having a round head with an internal hexagon. The bolt head may accordingly be embedded in the support. Moreover this support carries on its end face a rib 11 co-operating with the hollow profile of the carrier bar 1. A recess 12 is also provided for receiving the pin 8. Naturally the projecting portion could be provided on the support member 2, and the recess in the bearing block 3.

In the bore 6 of the bearing block 3 an insert 15 having a smooth bore 16 is inserted with the bore 16 aligned with the bore 5 in the block 3. The insert could, however, alternatively be arranged in such a manner that it is located in the bore 6 only partially. This insert is conveniently made of rubber or plastic material, for example a synthetic material such as polyamide. Accordingly the screw bolt is secured against being turned inadvertently.

With carrier bars having a fully profile the bores 5 and 6 are directly formed in the carrier bar, which moreover has a projecting portion (or corresponding recess). With carrier bars having an H-profile a bearing block is fitted to the web of the profile which is adapted to the shape of profile of the carrier bar.

In Figs. 3 and 4 a further embodiment is illustrated in which the heddle rail 13 is fixedly attached to the carrier bar by means of rivets 14, or forms an integral part thereof.

The ends of the carrier bar are designed in the manner described hereinabove with reference to Fig. 1. In order to prevent any turning of the carrier bar with respect to the lateral support when using a single screw bolt 10 as a connection between them, a portion 8' of the heddle rail projects beyond the stepped back end of the carrier bar. In the side support member a recess 12' is provided at an appropriate place in order that the heddle rail may engage into the same when the side support member is fitted. It is clear that, instead of the projecting heddle rail engaging into the side support, pins or plates may be provided on the bearing, on the end of the carrier bar or on the heddle rail which likewise engage into or embrace the side support member. Likewise pins or similar elements may be inserted in the side support member, which engage in a corresponding recess in the carrier bar, heddle rail or bearing block, and accordingly secure the support against being turned.

This harness frame is distinguished by great simplicity in that it consists in the dismantled condition only of two carrier bars with fixedly mounted heddle rail and two side support members, each having two screw bolts.

The embodiments illustrated offer many advantages. The lateral support members can be quickly exchanged without further preparation. This exchanging of the lateral support members is possible even in the loom, since the heddles need not be removed from the harness frame nor has the connection of the carrier bars to the heddle rails to be detached; for the removal and reinsertion of the lateral support members the distance between the upper and the lower carrier bar or heddle rail, respectively need not be increased or reduced even for a short time. When for any reasons a lateral support member breaks, wears out or is otherwise damaged replacement is possible without difficulty. By exchanging shorter lateral support members for longer or vice versa, an existing harness frame may be adapted for receiving longer or shorter heddles. Existing side support members may be exchanged at any time for thicker or thinner lateral support members, in order to adapt an existing harness frame to a different pitch of shafts. Harness frames having detachable lateral support members may be stored and dispatched in the dismantled condition in contrast to the usual harness frames. Thereby considerable saving in storage space, packing material and freight costs can be attained, inasmuch as for use the assembly of the harness frames can be carried out in the simplest manner possible by auxiliary personnel.

While I have herein described and illustrated in the accompanying drawings what may be considered typical and particularly useful embodiments of my said invention, I wish it to be understood that I do not limit myself to the particular details and dimensions described and illustrated, for obvious modifications will occur to a person skilled in the art.

I claim:

1. In a harness frame including carrier bars detachably joined at their ends to side support members, each joint comprising in combination a single bore extending longitudinally into the carrier bar from the end thereof and having an interior screw thread therein, a screw bolt extending transversely through the side support member into said bore in engagement with said interior screw thread in the bore, interlocking means on said carrier bar and side support member preventing relative rotation of the carrier bar and side support member on said screw bolt when said screw bolt is tightened, and locking means in said bore engaging said screw bolt to retain the same in tightened position.

2. The harness frame as set forth in claim 1, in which said interlocking means comprises a mating projection on and recessed in said carrier bar and side support member.

3. The harness frame as set forth in claim 1, including a heddle rail secured to said carrier bar along a longitudinal edge thereof, an end extension on said heddle rail projecting beyond the end of said carrier bar, and a recess in said side support member for receiving said heddle rail extension to form therewith said interlocking means.

4. The harness frame as set forth in claim 1, in which said carrier bar comprises a hollow profile member, and a support block secured within the end portion of said hollow profile member, said single bore being provided in said support block.

5. The harness frame as set forth in claim 4, in which said interlocking means are provided on said side support member and support block.

6. The harness frame as set forth in claim 1, in which said carrier bar has a transverse hole therethrough intersecting said single bore, and an insert disposed in said transverse hole and having a transverse bore therethrough of less initial diameter than the screw bolt, said insert being made of a weaker material than said screw bolt whereby when the screw bolt is forced through the transverse bore in said insert said insert serves as the locking means for said screw bolt.

7. In a harness frame including carrier bars detachably joined at their ends to side support members, each joint comprising in combination a recess in the end of said carrier bar, a support block secured in said recess, a single threaded bore extending longitudinally of the carrier bar into said support block from the outer end thereof and intersecting a transverse hole through said support block, an insert in said transverse hole having a bore therethrough in alignment with said single threaded bore in the support block, a screw bolt extending transversely through said side support member in thread engagement with said single threaded bore and through said bore in the insert, said insert being made of weaker material than the screw bolt and the bore in said insert being of less initial diameter than said screw bolt whereby said insert serves as a locking means for said screw bolt, and interlocking means fixedly connected with said carrier bar and side support member to prevent relative rotation thereof on said screw bolt.

References Cited in the file of this patent

UNITED STATES PATENTS

| 2,725,915 | Johnson | Dec. 6, 1955 |
| 2,802,503 | Zupa | Aug. 13, 1957 |

FOREIGN PATENTS

| 320,157 | France | Apr. 3, 1902 |
| 1,009,932 | France | June 5, 1952 |